(12) United States Patent
Ono et al.

(10) Patent No.: US 8,045,294 B2
(45) Date of Patent: Oct. 25, 2011

(54) SLIDER, INTEGRATED SLIDER, AND HYBRID STORAGE DEVICE

(75) Inventors: Tomoki Ono, Tokyo (JP); Shintaro Miyanishi, Nara (JP); Kousuke Innami, Nara (JP); Yoshiteru Murakami, Nishinomiya (JP)

(73) Assignee: Sharp Kabushiki Kaisha, Osaka (JP)

( * ) Notice: Subject to any disclaimer, the term of this patent is extended or adjusted under 35 U.S.C. 154(b) by 445 days.

(21) Appl. No.: 12/306,484

(22) PCT Filed: Jul. 3, 2007

(86) PCT No.: PCT/JP2007/063276
§ 371 (c)(1),
(2), (4) Date: Feb. 20, 2009

(87) PCT Pub. No.: WO2008/004535
PCT Pub. Date: Jan. 10, 2008

(65) Prior Publication Data
US 2009/0279208 A1    Nov. 12, 2009

(30) Foreign Application Priority Data
Jul. 3, 2006    (JP) .................................. 2006-183605

(51) Int. Cl.
*G11B 5/60* (2006.01)
(52) U.S. Cl. ..................... 360/234.3; 360/235; 360/314; 360/324; 360/240

(58) Field of Classification Search ............... 360/234.3, 360/235, 314, 324, 240, 59, 51, 48, 31
See application file for complete search history.

(56) References Cited

U.S. PATENT DOCUMENTS

| 6,771,589 B2 | 8/2004 | Ueyanagi et al. |
| 2001/0040868 A1 | 11/2001 | Ueyanagi et al. |
| 2004/0125704 A1 | 7/2004 | Ishi et al. |
| 2006/0114756 A1* | 6/2006 | Kojima et al. ............. 369/13.17 |

FOREIGN PATENT DOCUMENTS

| JP | 2001-291264 A | 10/2001 |
| JP | 2001-319365 | 11/2001 |
| JP | 2004-061880 A | 2/2004 |
| JP | 2004-127389 A | 4/2004 |
| JP | 2004-362771 A | 12/2004 |

OTHER PUBLICATIONS

Barnes et al., Surface plasmon subwavelength optics, Nature, vol. 424, pp. 824-883, Aug. 2004.

* cited by examiner

*Primary Examiner* — Thong Q Le
(74) *Attorney, Agent, or Firm* — Birch, Stewart, Kolasch & Birch, LLP

(57) ABSTRACT

An opening (3) is formed on a surface of a metal film (2), a plurality of axes (4, 5, 6, 7) cross each other substantially perpendicularly at the opening (3), a plurality of periodic grooves (8, 9, 10, 11) are provided for respective axes (4, 5, 6, 7), and each of the periodic grooves (8, 9, 10, 11) includes a plurality of grooves (8-$n$, 9-$n$, 10-$n$, and 11-$n$) substantially perpendicular to the axis for which each periodic groove is provided, and the periodic grooves (8, 9, 10, 11) is positioned point-symmetrically with respect to the opening (3).

10 Claims, 12 Drawing Sheets

F I G. 4
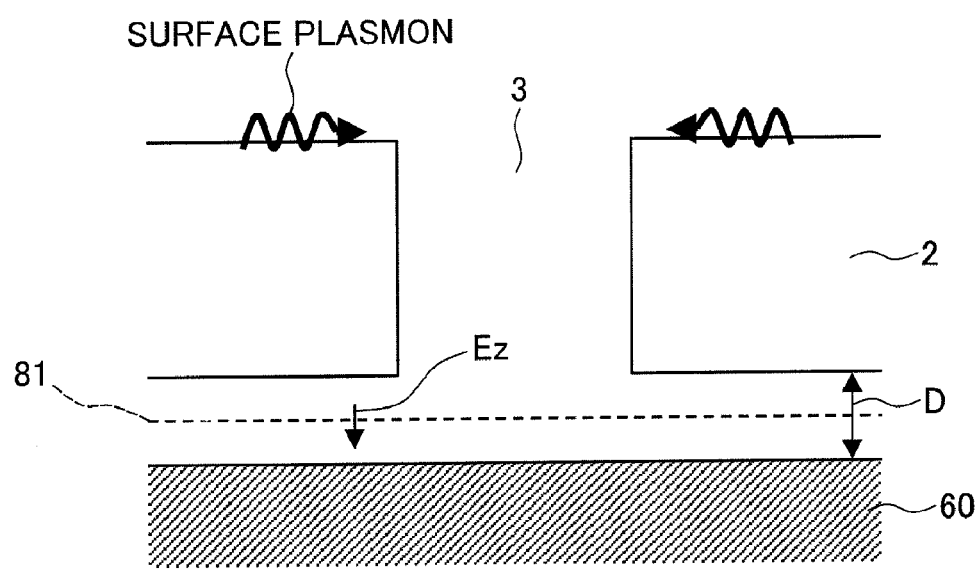

F I G. 6
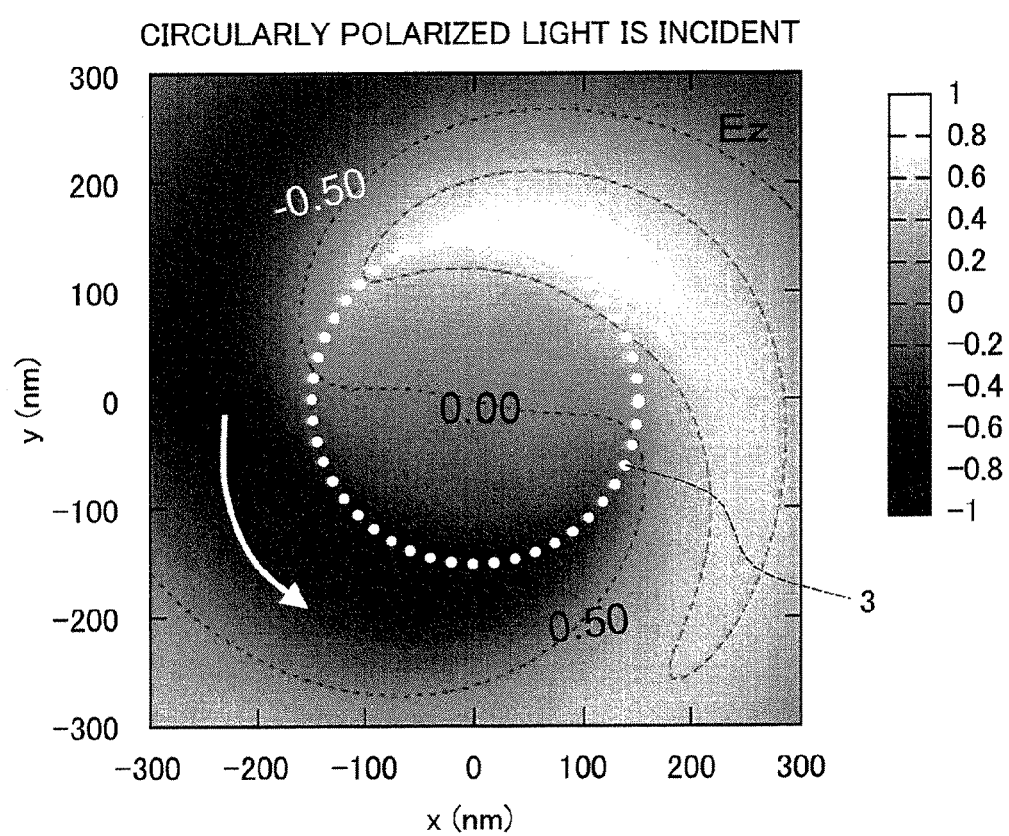

F I G. 7
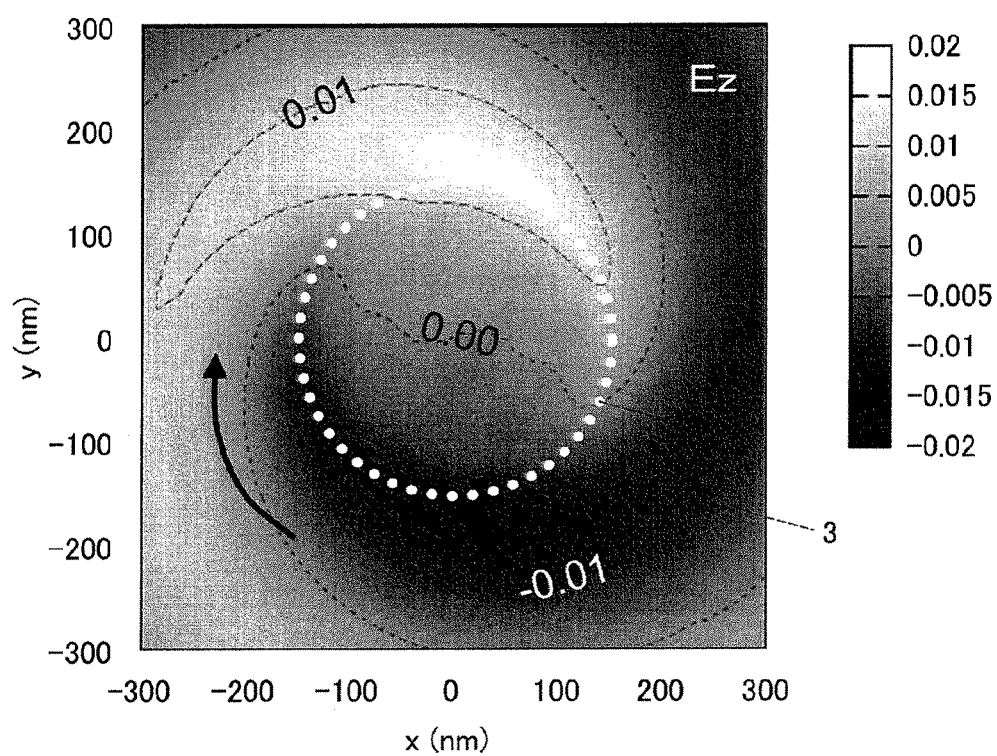

F I G. 8
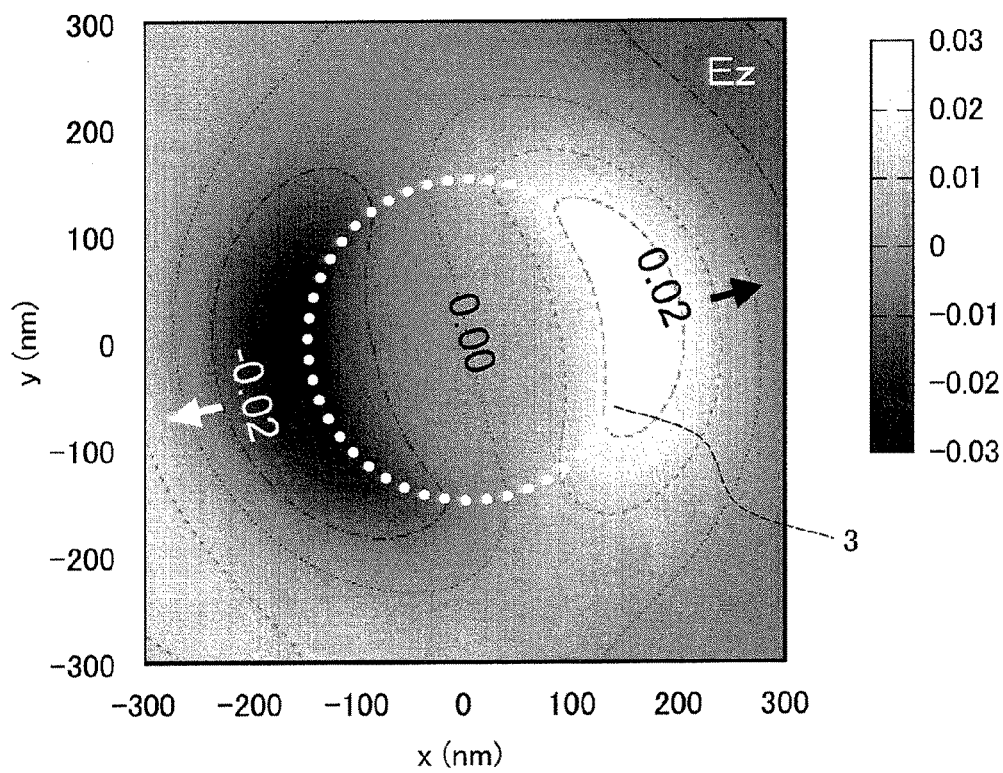

F I G. 1 5
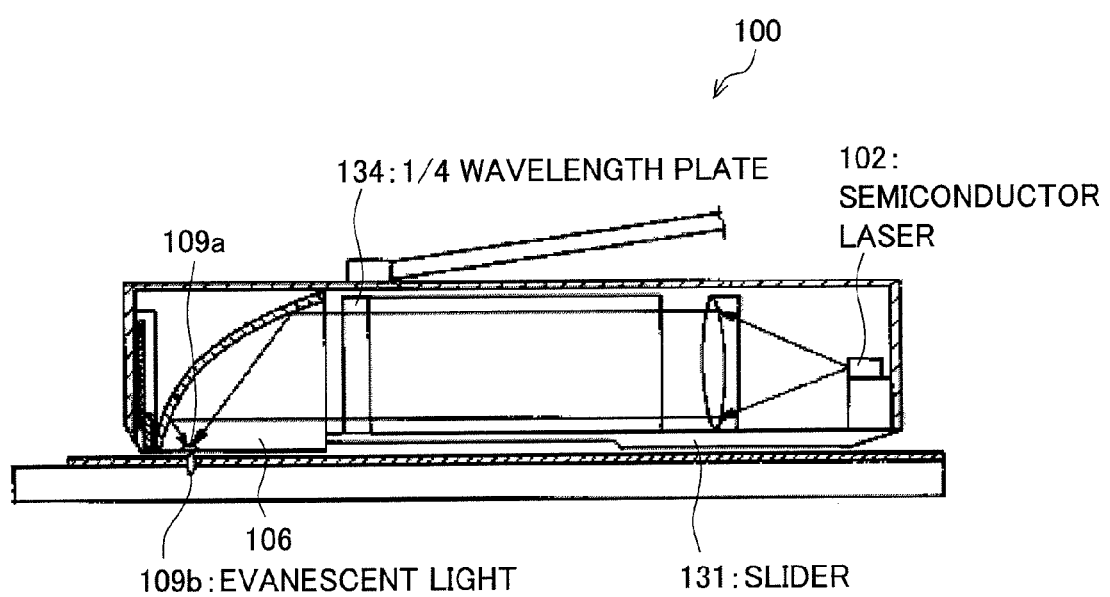

SLIDER, INTEGRATED SLIDER, AND HYBRID STORAGE DEVICE

TECHNICAL FIELD

The present invention relates to a hybrid storage device for causing information to be stored in an information storage medium. In particular, the present invention relates to a slider for causing magnetic information to be stored in a magnetic storage medium.

BACKGROUND ART

A hard disc drive (HDD) has been widely used as an information storage medium. However, recording density of a hard disc drive is increasing more and more, closing to super paramagnetic limit where magnetic information becomes instable.

The super paramagnetic limit is explained below with reference to equation (1).

$$-kmV/kT \qquad (1)$$

Equation (1) indicates thermal fluctuation constant, and km, V, k, and T indicate magnetic anisotropic energy, recording bit volume, Boltzmann constant, and absolute temperature, respectively. In a conventional medium for magnetic storage (hard disc), volume (V) of recording bit decreases as recording density becomes higher, and consequently the thermal fluctuation constant becomes larger. It is generally known that larger thermal fluctuation constant results in instability of magnetic information, such as accidental spin inversion.

Therefore, in order to realize higher density, there has been studied hybrid storage that is generally called heat-assisted magnetic recording, optical-assisted magnetic recording, laser-assisted magnetic recording etc. In the hybrid storage, a magnetic storage layer having high capacity of magnetic information at room temperature is used in a storage medium in order to prevent instability of magnetic information, and at the time of magnetic storage, an external magnetic field is applied while the temperature of a magnetic storage area is increased in order to facilitate spin inversion.

This allows forming a magnetic storage bit smaller than external magnetic distribution in a case where heat gradient steeper than external magnetic gradient is given to the surrounding of the magnetic storage area.

In order to heat such magnetic storage layer, evanescent light that is localized sufficiently smaller than diffraction limit of light is employed. Evanescent light is generated by irradiating laser to an evanescent light generation mechanism made of a minute metal opening smaller than the wavelength.

Patent Document 1 discloses a recording/reproduction head 100 that is a slider in which a semiconductor laser 102, a ¼ wavelength plate 134, a transparent light-converging medium 106 serving as an evanescent light generation mechanism, an optical spot 109a, and an optical system are integrated, as illustrated in FIG. 15.

With the configuration, linearly polarized light generated from the semiconductor laser 102 is converted by the ¼ wavelength plate 134 into circularly polarized light and then passes through the transparent light-converging medium 106 so as to be converged to the optical spot 109a. Light emitted from the optical spot 109a is evanescent light 109b. Converting the linearly polarized light into the circularly polarized light allows forming thermal distribution that is rotation-symmetrical with respect to a magnetic storage layer (not shown).

However, a slider used in a hard disc drive is getting smaller year after year. The size of a general slider at present is approximately 0.8 (depth)×0.7 (width)×0.3 (height) mm. The weight of a general slider is decreasing exponentially as the slider is getting smaller year after year. It is expected that the weight will decrease further.

It is known that, in general, as the size of a slider gets smaller and the weight of the slider decreases, moment of inertia of a suspension to which the slider is fixed drops, making the access speed higher.

On the other hand, the length of a resonator of edge-emitting semiconductor laser ranges from 0.2 to 1.0 mm, the width of a chip ranges from 0.2 to 0.5 mm, and the height of the chip ranges from 0.1 to 0.3 mm, which is substantially the same size as the aforementioned small slider. That is, the integrated slider with the above configuration where the optical lens and the wavelength plate are combined has a problem that it is difficult to downsize the slider and that there is a possibility that the slider gets larger.

[Patent Document 1]
Japanese Unexamined Patent Publication No. Tokukai 2004-362771 (published on Dec. 24, 2004)
[Non-Patent Document 1]
W. L. Barnes, A Dereux, T. W. Ebbesen, Nature 424, 824 (2003)

DISCLOSURE OF INVENTION

The present invention was made in view of the foregoing problem. An object of the present invention is to provide a slider, an integrated slider, and a hybrid storage device, each capable of increasing access speed of the slider by downsizing the slider substantially as small as semiconductor laser.

In order to solve the foregoing problem, the slider of the present invention is a slider for writing information in and reading information from a magnetic storage layer, including a metal film, an opening being formed on a surface of the metal film, a plurality of axes crossing each other substantially perpendicularly at the opening, a plurality of periodic grooves being provided for respective axes, and each of the periodic grooves including a plurality of grooves substantially perpendicular to the axis for which each periodic groove is provided, and the periodic grooves being positioned point-symmetrically with respect to the opening.

This allows converting linearly polarized light irradiated to the surface of the metal film into circularly polarized light. In other words, this allows converting the flow of light energy irradiated to the surface of the metal film into evanescent light with use of the periodic grooves and generating swirl of evanescent light with the opening at the center. Further, it is possible to make the size of the swirl smaller than the resolution limit of light, i.e. the wavelength of light.

The word "evanescent light" used in the specification corresponds to the meaning of "Near Field", and includes all electromagnetic fields in a region smaller than wavelength. "Near Field" indicates inclusion of propagation light composed of non-vibration components of a pointing vector and an evanescent field composed of vibration components of the pointing vector.

Further, since the opening is formed at the center of the periodic grooves, it is possible to effectively lead the swirl of the evanescent light to the opening.

Consequently, an optical component for converting linearly polarized light into circularly polarized light is unnecessary, which allows downsizing the slider. This allows reducing the weight of the slider, which allows reducing moment of inertia of the slider. This allows increasing access speed of the slider.

BRIEF DESCRIPTION OF DRAWINGS

FIG. 4 is a cross sectional drawing illustrating positions of the surrounding of the opening and a magnetic storage layer on the surface of the metal film of the slider in accordance with one embodiment of the present invention.

FIG. 6 is a strength distribution chart of an instant electric field in a case where linearly polarized light is incident to an xy-plane at a gap between the metal film of the slider in accordance with one embodiment of the present invention and the magnetic storage layer and left-handed circularly polarized light is irradiated from the opening.

FIG. 7 is a strength distribution chart of an instant electric field in a case where phases of electric dipoles of grooves 9-1 and 11-1 in FIG. 3 are made slower by $\pi/2$ than phases of electric dipoles of grooves 8-1 and 10-1.

FIG. 8 is a strength distribution chart of an instant electric field in a case where phases of electric dipoles of the grooves 9-1 and 11-1 in FIG. 3 are identical with phases of electric dipoles of the grooves 8-1 and 10-1.

FIG. 15 is a drawing schematically illustrating a main arrangement of a conventional integrated slider.

REFERENCE NUMERALS

Figure 1:
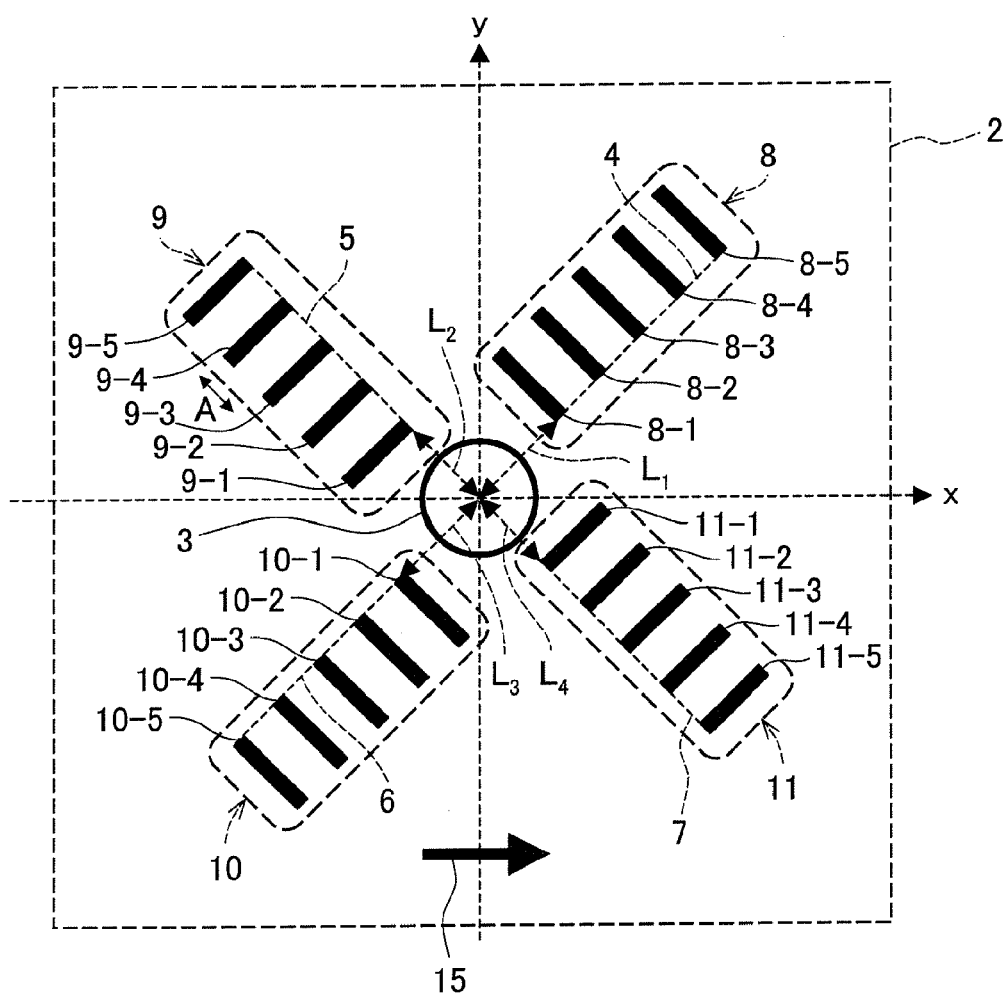
FIG. 1 is a plane drawing illustrating a surface of a metal film of a slider in accordance with one embodiment of the present invention.

2: metal film
3: opening
4: axis
5: axis
6: axis
7: axis
8: periodic groove
8-1, 8-2, 8-3, 8-4, 8-5: groove
9: periodic groove
9-1, 9-2, 9-3, 9-4, 9-5: groove
10: periodic groove
10-1, 10-2, 10-3, 10-4, 10-5: groove
11: periodic groove
11-1, 11-2, 11-3, 11-4, 11-5: groove
20: slider
50: disc substrate
60: magnetic storage layer
70: head (optical component)
71: ridge section (resonator of semiconductor laser)

BEST MODE FOR CARRYING OUT THE INVENTION

One embodiment of the present invention is described below with reference to FIGS. 1-14.

[Outline of Slider]

(1-1. Metal Plane of Slider)

An explanation is made below as to the surface of a metal film 2 on a surface of a slider 20 with reference to FIG. 1.

As illustrated in FIG. 1, an opening 3 serving as a hole is formed on the surface of the metal film 2. Axes 4, 5, 6, and 7 cross each other substantially perpendicularly near the center of the opening 3. For the axis 4, there is provided a periodic groove 8 including grooves 8-1, 8-2, 8-3, 8-4, and 8-5 that are positioned substantially perpendicularly to the axis 4 and are arrayed in the order of closeness to the opening 3.

Similarly, for the axis 5, there is provided a periodic groove 9 including grooves 9-1, 9-2, 9-3, 9-4, and 9-5 that are positioned substantially perpendicularly to the axis 5 and are arrayed in the order of closeness to the opening 3.

Similarly, for the axis 6, there is provided a periodic groove 10 including grooves 10-1, 10-2, 10-3, 10-4, and 10-5 that are positioned substantially perpendicularly to the axis 6 and are arrayed in the order of closeness to the opening 3.

Similarly, for the axis 7, there is provided a periodic groove 11 including grooves 11-1, 11-2, 11-3, 11-4, and 11-5 that are positioned substantially perpendicularly to the axis 7 and are arrayed in the order of closeness to the opening 3. Note that the periodic grooves 8, 9, 10, and 11 do not penetrate the metal film 2.

Hereinafter, a groove 8-*n* indicates all the grooves 8-1, 8-2, 8-3, 8-4, and 8-5 that constitute the periodic groove 8. The same holds for grooves 9-*n*, 10-*n*, and 11-*n*.

The number of n is not particularly limited. The larger number of n allows a wider area where incident light is received. However, surface plasmon decreases while it is propagated in the periodic grooves 4, 5, 6, and 7 and therefore the number of n is preferably 5. The present embodiment will be explained under the condition that the number of n is 5.

In the present embodiment, the grooves 8-*n*, 9-*n*, 10-*n*, and 11-*n* of the periodic grooves 8, 9, 10, and 11 are concave with respect to the surface of the metal film 2.

However, the grooves 8-*n*, 9-*n*, 10-*n*, and 11-*n* are provided in order to form periodic refraction index distribution on the surface of the metal film 2.

Therefore, the grooves 8-*n*, 9-*n*, 10-*n*, and 11-*n* of the periodic grooves 8, 9, 10, and 11 may be convex with respect to the surface of the metal film 2.

Further, dielectric bodies may be embedded in the grooves 8-n, 9-n, 10-n, and 11-n. Examples of the dielectric bodies include group-IV semiconductor such as Si, Ge, and SiC, group-III-V compound semiconductor such as GaAs, GaP, InP, AlAs, GaN, InN, InSb, GaSb, and AlN, group II-VI compound semiconductor such as ZnTe, ZeSe, ZnS, and ZnO, oxide insulator such as ZnO, $Al_2O_3$, $SiO_2$, $TiO_2$, $CrO_2$, and $CeO_2$, and nitride insulator such as SiN.

Further, a groove for only generating surface plasmon has been widely studied. The periodic grooves 8, 9, 10, and 11 in the present embodiment may be made of the widely studied groove.

Further, the metal film 2 is made of gold (Au), silver (Ag), aluminum (Al) or the like. It is assumed that A is each of the distances between adjacent grooves 8-n, adjacent grooves 9-n, adjacent grooves 10-n, and adjacent grooves 11-n constituting the periodic grooves 8, 9, 10, and 11, respectively, in FIG. 1. It is known that an appropriate value of A allows surface plasmon to be excited on the surface of the metal film 2 by light incident to the metal film 2 (see Supplementary Explanation mentioned later).

The following explains the periodic grooves 8, 9, 10, and 11 provided on the surface of the metal film 2.

In a case where incident light is linearly polarized light 15 parallel to the x-axis, surface plasmon generated in the periodic grooves 8, 9, 10, and 11 are propagated toward the opening 3 along the axes 4, 5, 6, and 7 extending spokewise from the center of the opening 3

In the present embodiment, the periodic grooves 8, 9, 10, and 11 are provided point-symmetrically with respect to the opening 3, and are provided in a left-hand direction with respect to the axes 4, 5, 6, and 7 respectively, i.e., in a counterclockwise direction.

(1-2. Conversion into Circularly Polarized Light)

The following explains conversion of linearly polarized light irradiated to the surface of the metal film 2 into circularly polarized light.

In the periodic grooves 8, 9, 10, and 11 in FIG. 1, it is assumed that the distances between the grooves 8-1, 9-1, 10-1, and 11-1 nearest to the opening and the center of the opening 3 are L1-L4, respectively, and L1-L4 are set as follows.

In the present embodiment, the values of L1-L4 are important as shown in later-mentioned equation (2), and therefore the values of L1-L4 may be determined in several manners. However, the grooves 8-1, 9-1, 10-1, and 11-1 nearest to the opening 3 must be under the same condition.

As illustrated in (a)-(c) of FIG. 2, the values of L1-L4 may be determined in the following three manners.

Figure 2:
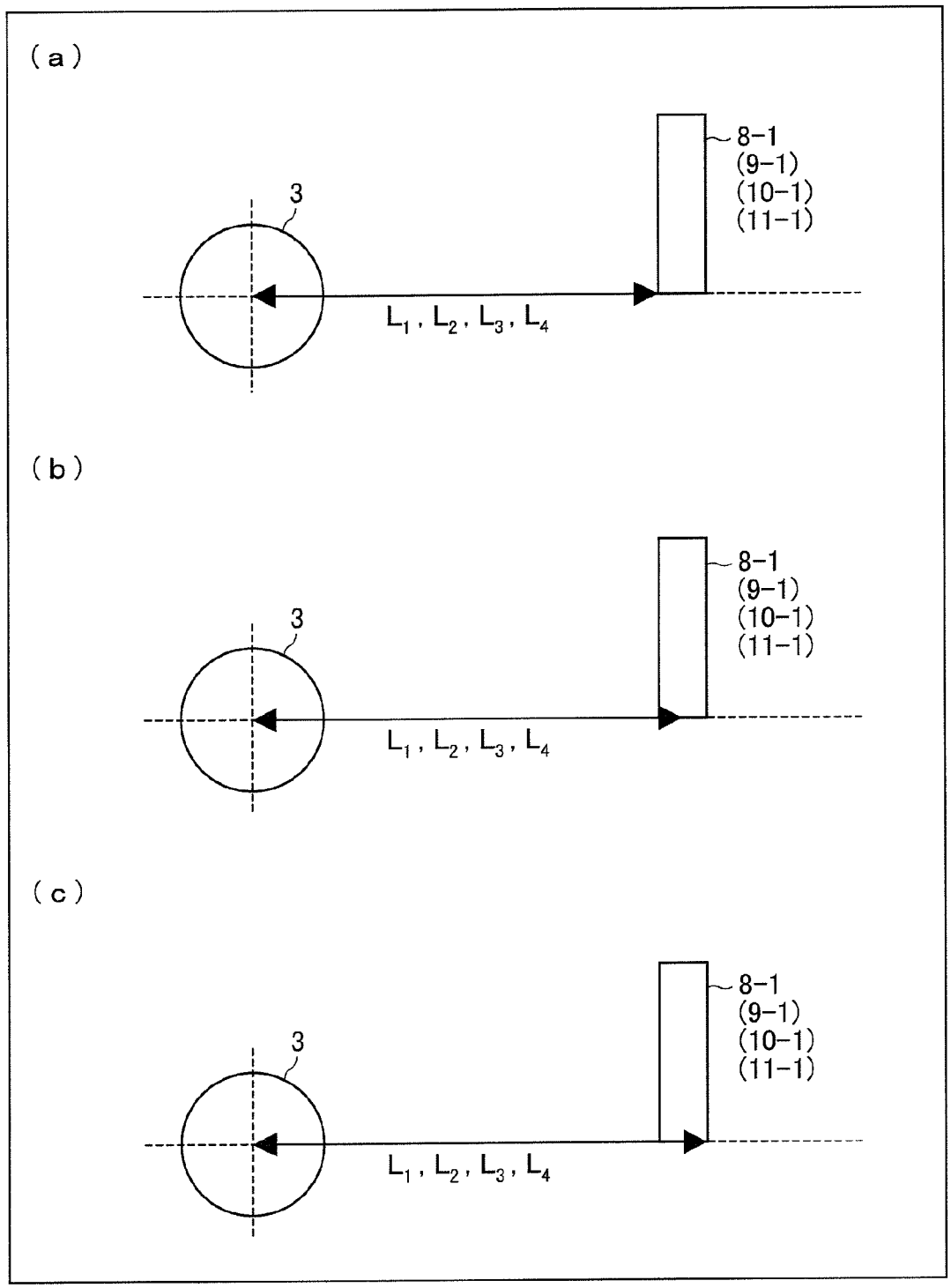
FIGS. 2 ((*a*), (*b*), and (*c*)) is a drawing schematically illustrating relationships between an opening and periodic grooves on the surface of the metal film of the slider in accordance with one embodiment of the present invention.

As illustrated in (a) of FIG. 2, L1-L4 are determined as distances between the origin that is the center of the opening 3 and sides of the grooves 8-1, 9-1, 10-1, and 11-1 which sides are nearer to the opening 3.

Further, as illustrated in (b) of FIG. 2, L1-L4 are determined as distances between the origin that is the center of the opening 3 and the centers of the grooves 8-1, 9-1, 10-1, and 11-1, respectively.

Further, as illustrated in (c) of FIG. 2, L1-L4 are determined as distances between the origin that is the center of the opening 3 and sides of the grooves 8-1, 9-1, 10-1, and 11-1 which sides are farer from the opening 3.

In each of (a), (b), and (c) of FIG. 2, the value of δL in the equation (2) does not change and therefore it is possible to obtain the effect of the present embodiment. Note that the grooves 8-1, 9-1, 10-1, and 11-1 must be under the same condition that is one of (a)-(c) of FIG. 2.

Further, in a case where relations $$L_1 = L_3$$

$$L_2 = L_4$$

$$\delta L = L_1 - L_2 = \lambda_{sp}/4 \tag{2}$$

are met, the periodic grooves 8, 9, 10, and 11 are provided point-symmetrically with respect to the opening 3, and are provided in a left-hand direction with respect to the axes 4, 5, 6, and 7 respectively, i.e., in a counterclockwise direction in the present embodiment. Therefore, when light is incident to the surface of the metal film 2, a mode made of counterclockwise-circularly polarized light is generated in the opening 3.

That is, in a case where the wavelength of surface plasmon is λSP, when δL is one-fourth of λSP, surface plasmon excited by incident light whose axis of linearly polarized light is in the x-direction reaches the surrounding of the opening 3, which generates phase shift of π/2.

In the above example, phase of surface plasmon derived from the periodic groove 11 is made earlier by π/2 from phase of surface plasmon derived from the periodic groove 8. This allows the surface plasmon derived from the periodic groove 11 to reach the surrounding of the opening 3 firstly, although the surface plasmon derived from the periodic groove 8 and the surface plasmon derived from the periodic groove 11 are excited simultaneously.

The surface plasmon derived from the periodic groove 11 excites an edge of the opening 3, and ¼ period later the surface plasmon derived from the periodic groove 8 excites a portion of the opening 3 which portion is positioned counterclockwise by π/2 from the edge of the opening 3.

In the case of the periodic groove 8 for example, the time when surface plasmon propagated in the axis 4 direction from the position shifted counterclockwise from the axis 4 reaches the opening 3 is a little later than the time when surface plasmon on the axis 4 reaches the opening 3.

An arrangement in which the periodic grooves 8, 9, 10, and 11 are provided counterclockwise with respect to the axes 4, 5, 6, and 7, respectively, is referred to as a left-handed arrangement, and an arrangement in which the periodic grooves 8, 9, 10, and 11 are provided clockwise with respect to the axes 4, 5, 6, and 7, respectively, is referred to as a right-handed arrangement. In the left-handed arrangement, too, it is possible to generate a little amount of left-handed circularly polarized light at the opening 3.

Here, a case where an axis of linearly polarized light is in the x-axis direction is discussed. Note that in a case where the linearly polarized light is in the y-axis direction, signs in the equation (2) are inverted.

In the present embodiment, positional relationship between a rotation direction and incident light is important. In order to form a mode of left-handed circularly polarized light at the opening 3, an axis closest to the linearly polarized light is selected with respect to each of positive and negative rotation directions so that L1-L4 become large along a rotation direction of desired circularly polarized light.

In order to form a mode of right-handed circularly polarized light at the opening, it is preferable to provide the periodic grooves 8, 9, 10, and 11 clockwise in such a manner that a relation L2−L1=λSP/4 is met.

Due to the mode thus generated, left-handed circularly polarized light is irradiated from the opening 3. Since the opening 3 is sufficiently small, localized evanescent light is generated.

[2. FDTD Modeling]

The following shows the result of verification of excitation of surface plasmon through Finite-Difference Time-Domain (FDTD) method that is three-dimensional electromagnetic analysis based on Maxwell equation.

In order to exactly model surface plasmon, mesh of approximately 4 nm is used in view of attenuation length of an electric field in metal. Therefore, it is difficult to use all of the periodic grooves 8, 9, 10, and 11 in modeling calculation since it requires a large amount of calculation.

Figure 3:
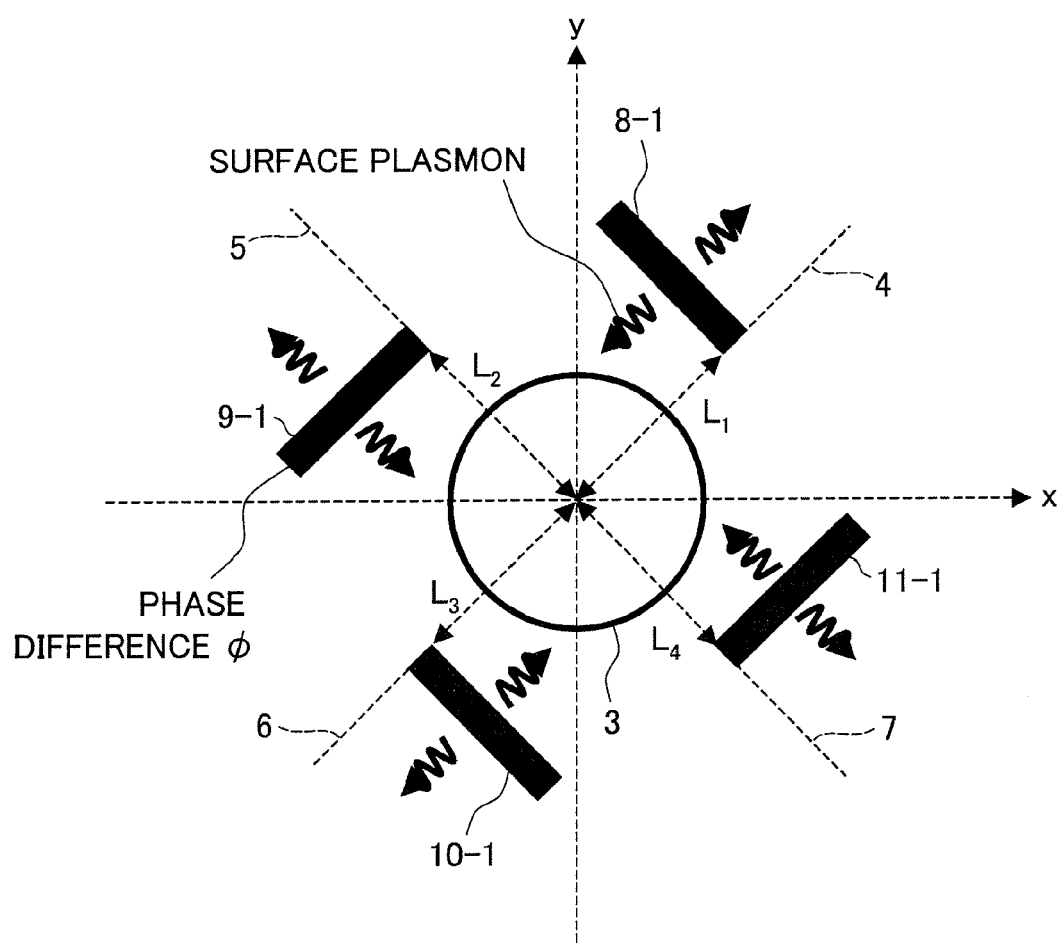
FIG. 3 is a plane drawing illustrating positions of the opening and grooves on the surface of the metal film of the slider in accordance with one embodiment of the present invention.

In the present embodiment, in accordance with a publicly known phenomenon that surface plasmon is generated in each periodic groove as illustrated in FIG. 3, surface plasmon is generated in four areas (the grooves 8-1, 9-1, 10-1, and 11-1), and in accordance with the equation (2), phases of surface plasmon generated in the grooves 9-1 and 11-1 are supposed to be earlier by $\pi/2$ than phases of surface plasmon generated in the grooves 8-1 and 10-1 and are used in modeling calculation.

In modeling calculation of FDTD, shifting phase earlier corresponds to shortening L1, L2, L3, and L4 that are the distances between the grooves 8-1, 9-1, 10-1, and 11-1 and the center of the opening 3, respectively.

That is, phase can be adjusted by adjusting the positions of the grooves 8-1, 9-1, 10-1, and 11-1 on the axes 4, 5, 6, and 7, respectively, in accordance with later-mentioned equations (5) and (6).

Further, in the present embodiment, the metal film 2 is regarded as an infinite metal film, and therefore the FDTD method of the Total-Field/Reflected-Field (TFRF) method is used and a 4 nm cubic cell is used. Here, whole calculation size is 150×150×50 cells.

The following explains a specific structure used in modeling calculation of FDTD with reference to FIG. 4.

FIG. 4 is a enlarged cross sectional drawing illustrating the opening 3 formed in the metal film 2 used in the modeling calculation of FDTD and a magnetic storage layer 60.

As illustrated in FIG. 4, the opening 3 is formed in the metal film 2 and the magnetic storage layer 60 is positioned away by a gap D from the surface of the metal film 2.

Further, it is assumed that an xy-plane 81 is positioned substantially at the center of the gap D, a direction from the metal film 2 to the magnetic storage layer 60 is a plus direction, and an electric field that passes through the xy-plane 81 is an instant electric field Ez.

The thickness of the metal film 2 was 120 nm and the material of the metal film 2 was Ag. The radius of the opening 3 was 150 nm, the material of the magnetic storage layer 60 was cobalt (Co), and the thickness of the film was regarded as being semi-infinite in view of modeling calculation. A gap D between the magnetic storage layer 60 and the metal film 2 was 28 nm.

A magnetic storage layer that is currently known is substantially the same as Co in terms of optics, and therefore the result of calculation in the present embodiment may be applied to the currently known magnetic storage layer.

As illustrated in FIG. 3, surface plasmon is excited by electric dipoles whose amplitude directions are parallel to axes 4, 5, 6, and 7, respectively.

In the present embodiment, frequency of electric dipole was set to correspond to 658 nm that is the wavelength in vacuum.

In general, electric dipole smaller than the wavelength has an extent in a wave number space, and therefore it can excite the surface plasmon.

In such an exciting source, the surface plasmon is propagated in two directions, i.e., inner and outer directions with respect to the opening 3, as illustrated in FIG. 3. However, since PML boundary is used in FDTD method, it is possible to remove reflection from the boundary, so that it is possible to neglect contribution of a component propagated to the outside.

Further, at a side of the opening 3 where light is irradiated and on the Co film, the Ag film and the Co film serve as slab wave guides and therefore the instant electric field Ez in the z-axis direction is dominant. That is, when an electric field irradiated from the opening 3 is circularly polarized light, the pattern of the instant electric field Ez is a spiral whose center is the opening 3.

Figure 5:
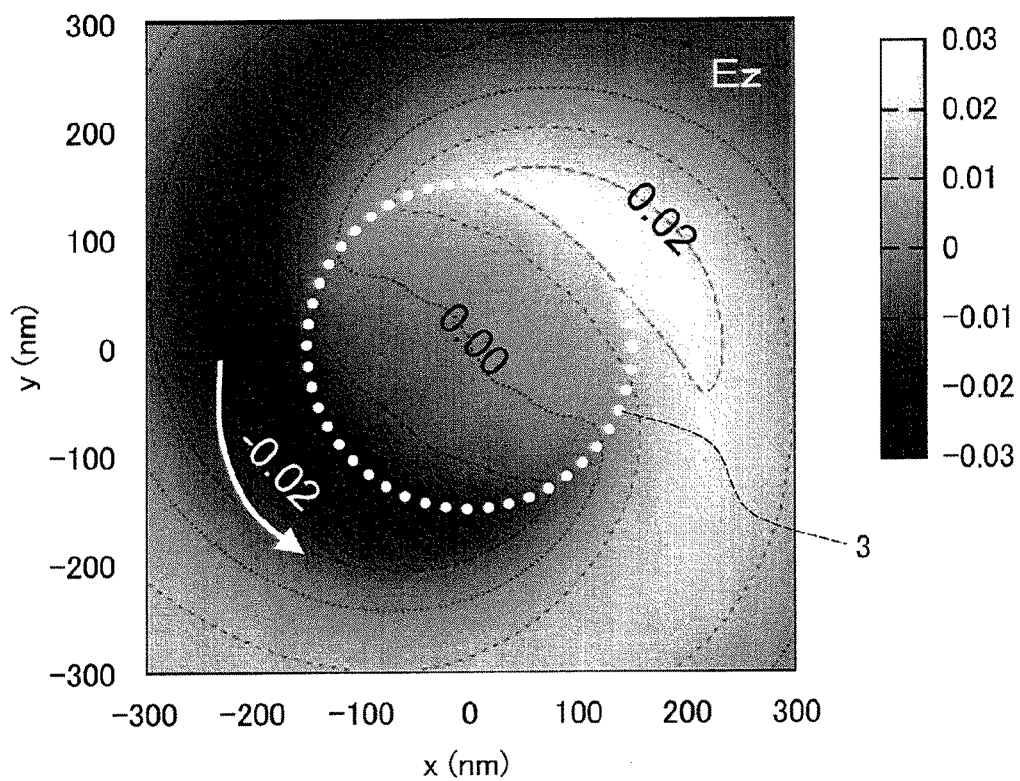
FIG. 5 is a strength distribution chart of an instant electric field in a case where linearly polarized light is incident to an xy-plane at a gap between the metal film of the slider in accordance with one embodiment of the present invention and the magnetic storage layer and left-handed circularly polarized light is irradiated from the opening.

FIG. 5 illustrates strength distribution of the instant electric field Ez at the xy-plane 81 positioned at the gap between the metal film 2 and the magnetic storage layer 60. In the xy-plane 81, left-handed circularly polarized light was obtained.

For comparison, FIG. 6 illustrates the instant electric field Ez at the xy-plane 81 in a case where a plane wave of the left-handed circularly polarized light instead of the electric dipole was incident to the opening 3.

FIGS. 5 and 6 may not be quantitatively compared with each other since incident strengths in FIGS. 5 and 6 are different from each other. However, it was confirmed in FIG. 6 as well as in FIG. 5 that light irradiated from the opening 3 was left-handed circularly polarized light.

FIG. 7 illustrates the result of making phases of electric dipoles of the grooves 9-1 and 11-1 slower by $\pi/2$ than phases of electric dipoles of the grooves 8-1 and 10-1.

The result shows that strength of the instant electric field Ez in FIG. 7 was lower than that in FIG. 5 and right-handed circularly polarized light was observed.

Further, FIG. 8 illustrates the result of a case where the phases are the same as each other. Substantially linearly polarized light was observed, but a little amount of left-handed circularly polarized light was also observed. The periodic grooves 8, 9, 10, and 11 are provided in left-handed directions of the axes 4, 5, 6, and 7, respectively, i.e. left-handedly. That is, the periodic grooves are provided to have left-handed symmetry with respect to the incident axis of light, i.e. chirality. Therefore, a little amount of left-handed circularly polarized light is generated.

As described above, when chiralities of the periodic grooves 8, 9, 10, and 11 are opposite to chirality derived from differences in phase of the surface plasmon, efficiency in conversion from linearly polarized light into circularly polarized light drops.

In view of the above, it is known that in the arrangement of FIG. 1, the periodic grooves 8, 9, 10, and 11 satisfying the equation (2) allow effectively generating left-handed circularly polarized light at the xy-plane 81 at the gap between the metal film 2 and the magnetic storage layer 60.

Note that the situation of FIG. 7 holds for a case where an axis of linearly polarized light of incident light in the arrangement of FIG. 1 is parallel to the y-axis.

[Hybrid Storage Device]

(3-1. Main Arrangement of Hybrid Storage Device)

Figure 9:
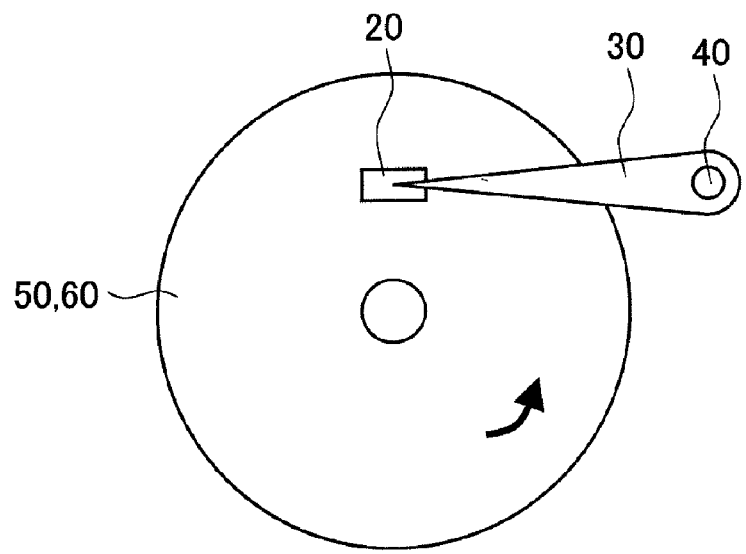
FIG. 9 is a plane drawing illustrating a hybrid storage device in accordance with one embodiment of the present invention.

FIG. 9 is a drawing schematically illustrating a hybrid storage device of the present embodiment.

As illustrated in FIG. 9, the hybrid storage device includes a disc substrate 50 including the magnetic storage layer near the surface, and a slider 20 floating above the disc substrate 50 by several nm-several ten nm. The slider 20 is fixed to a suspension 30 and the suspension 30 is connected with a supporter (not shown).

The shaft 40 can rotate in parallel with (seek) the surface of the disc substrate 50. This allows the suspension 30 and the slider 20 to rotate with the shaft 40 being the center.

For that reason, as the weight of the slider 20 at the edge of the suspension 30 is lighter, moment of inertia of the suspension 30 is smaller. This increases the access speed of the slider 20 when accessing to the surface of the magnetic storage layer 60 where target information is stored.

In the present embodiment, it is assumed that the disc substrate 50 rotates in a left-hand direction (counterclockwise).

(3-2. Semiconductor Laser)

Figure 10:
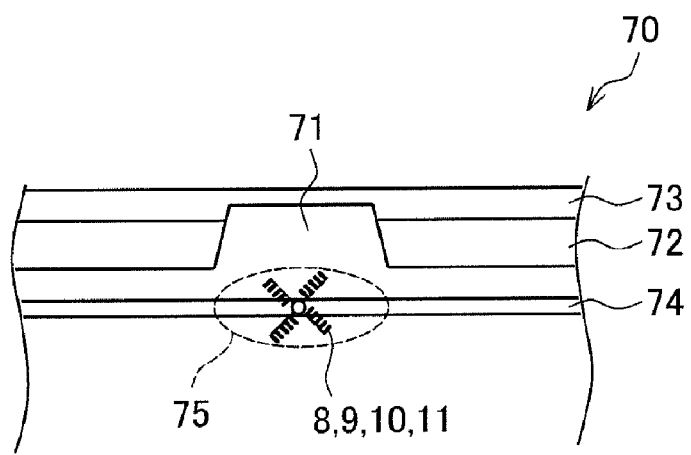
FIG. 10 is a drawing schematically illustrating a head of semiconductor laser embedded at a position adjacent to the slider in accordance with one embodiment of the present invention.

FIG. 10 illustrates positional relationship between a head 70 (optical component) of semiconductor laser embedded in a position adjacent to the slider 20 and the periodic grooves 8, 9, 10, and 11.

The head 70 includes a ridge section 71 (resonator of semiconductor laser) from which semiconductor laser is irradiated, an embedded layer 72, a p-electrode 73, and an active layer 74.

The head 70 may be made of various publicly known layer structures. In the present embodiment, the head 70 is not particularly limited.

In the present embodiment, semiconductor laser oscillated in a TE mode is linearly polarized light parallel to the active layer 74.

A laser spot 75 is positioned substantially above the active layer 74, and the head 70 illustrated in FIG. 10 is two-dimensionally enclosed by a ridge wave guide and an embedded wave guide.

A dielectric layer of 1 μm or less for preventing electric shortage is laminated on the edge surface of the head 70, and the metal film 2 is laminated on the dielectric layer. On the metal film 2, the opening 3 and the periodic grooves 8, 9, 10, and 11 are provided in such a manner that a laser spot is positioned at the center.

The structure provided in the metal film 2 may be formed through a conventional patterning process. Examples of the conventional patterning process include light exposure with use of a stepper, x-ray exposure, electron beam (EB) exposure, sweep electron beam (SEM) exposure, a process with use of focused ion beam (FIB), and nano-imprinting.

The metal film 2 may be combined in the ridge section 71. Portions of the metal film 2 and the periodic grooves 8, 9, 10, and 11 which portions do not bind to the surface plasmon contribute to induction and discharge of the surface plasmon in the ridge section 71. A high reflective film made of a dielectric body or metal is provided on a rear edge surface of the ridge section 71, allowing oscillation of semiconductor laser at a low threshold value.

Preferable examples of the semiconductor laser include: blue semiconductor laser of 380-480 nm in oscillation wavelength, mainly including gallium (Ga) and nitrogen (N) in an active layer made of a semiconductor quantum well; red semiconductor laser of 600 nm-infrared in oscillation wavelength, mainly including Ga and arsenic (As); near-infrared semiconductor laser; and infrared semiconductor laser.

(3-3. Integrated Slider)

Figure 11:
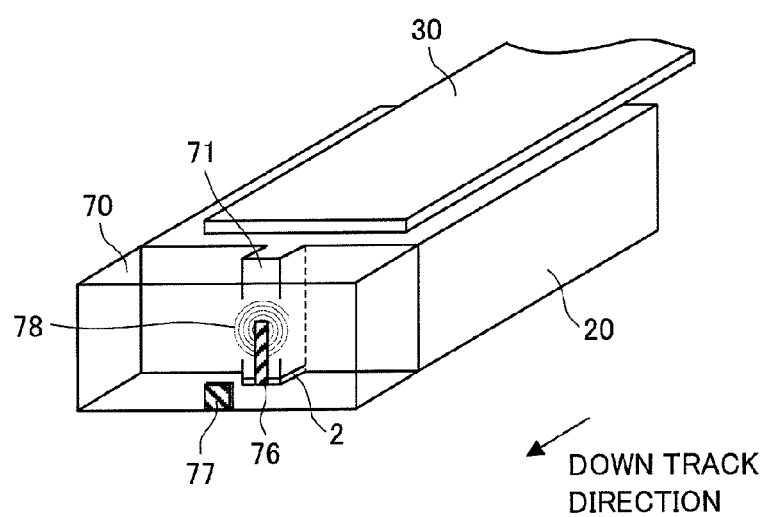
FIG. 11 is an oblique drawing illustrating a main arrangement of an integrated slider in accordance with one embodiment of the present invention.

FIG. 11 illustrates an integrated slider.

As illustrated in FIG. 11, the integrated slider includes a semiconductor laser substrate (not shown) inside the slider 20, and is connected with the suspension 30. Further, the head 70 is connected with the slider 20 in such a manner that the head 70 is adjacent to the slider 20.

The head 70 includes, on the plane in contact with the slider 20, the ridge section 71 of the semiconductor laser. The ridge section 71 is provided with the metal film 2 on the plane adjacent to the disc substrate 50 illustrated in FIG. 9. Further, a magnetic pole 76 and a coil 78 each serving as an external magnetic applying device for magnetic storage are provided to be in contact with the ridge section 71 of the semiconductor laser.

Further, a magnetic reproduction head 77 such as GMR is provided at the side of the head 70.

Under the lower side of the integrated slider, an air-rectifying mechanism generally called Air Bearing Surface (ABS) (not shown) is provided.

Consequently, the integrated slider receives a flow of air derived from the air-rectifying mechanism, passively and stably floating several nm-50 nm above the disc substrate illustrated in FIG. 9.

In the arrangement in FIG. 11, the side where the head 70 is provided is a down track direction that is a direction for reading magnetic information.

Figure 12:
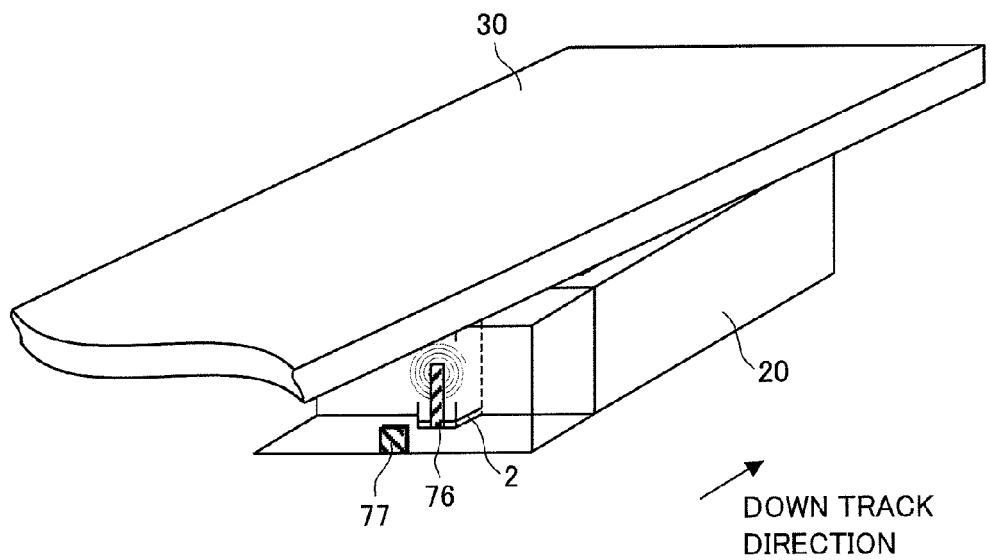
FIG. 12 is an oblique drawing illustrating a case where a head and a slider in the integrated slider in accordance with one embodiment of the present invention are attached to a suspension in such a manner as to be reverse to the arrangement of FIG. 11.

FIG. 12 illustrates an arrangement of the integrated slider in FIG. 11 in which the head 70 and the slider 20 are connected with the suspension 30 in such a manner that the head 70 and the slider 20 are positioned in a reverse order. The down track direction in this case is opposite to the down track direction in FIG. 11. Details such as electric wires are omitted in the drawing.

The head 70 including a magnetic storage head and the external magnetic applying device for storage has a thickness of 0.01-0.05 mm. Since the periodic grooves 8, 9, 10, and 11 are provided in the metal film 2, the volume of the head 70 does not increase. Therefore, the integrated slider of the present embodiment can be downsized substantially as small as a semiconductor laser oscillator including the semiconductor laser substrate (not shown) and the ridge section of the semiconductor laser.

As described above, usage of the periodic grooves 8, 9, 10, and 11 allows greatly downsizing the size of the integrated slider, compared with a conventional arrangement of the integrated slider.

[4. Supplementary Explanation]

(4-1. Distance Between Grooves)

The value of A that is the distance between every adjacent grooves 8-$n$, adjacent grooves 9-$n$, adjacent grooves 10-$n$, and adjacent grooves 11-$n$ constituting the periodic grooves 8, 9, 10, and 11, respectively, is determined in such a manner that a component of wave number of incident light that is parallel to the surface of the metal film 2 is matched with wave number of surface plasmon propagated on the surface of the metal film 2. How to determine the distance is described in Non-Patent Document 1 for example, and is expressed by the following equation (3).

$$\text{Re}(k_{sp}) = \frac{2\pi}{A} + k_0 \sin\phi \tag{3}$$

Here, ksp is a wave number of surface plasmon, Re(ksp) is a real part thereof, k0 is a wave number in vacuum, and Φ is an incident angle. The incident angle of semiconductor laser irradiated to the metal film 2 is several degrees, and therefore it is sufficient that A that is the distance between grooves is a little longer than wavelength of surface plasmon.

This can be expressed by equation (4).

$$\frac{2\pi}{A[m]} - 1\times 10^{-7}[m] \le \frac{2\pi}{\lambda[m]}\text{Re}\left(\sqrt{\frac{\varepsilon_m + \varepsilon_d}{\varepsilon_m \varepsilon_d}}\right) \le \frac{2\pi}{A[m]} \tag{4}$$

where ∈m and ∈d are complex dielectric constants of the metal film 2 and the dielectric layer between the semiconductor laser and the metal film 2, respectively.

In a case where the incident angle is not more than several degrees, phase difference δΦ that is surface plasmon reaching the opening 3 via respective gratings is expressed by equation (5) with use of L1 and L2 described above.

$$\delta\phi = \left|\frac{2\pi(L_1 - L_2)}{\lambda}\right| \cdot \mathrm{Re}\left(\sqrt{\frac{\varepsilon_m + \varepsilon_d}{\varepsilon_m \varepsilon_d}}\right) = \frac{2\pi\delta L}{\lambda_{sp}} \quad (5)$$

When the difference between the distances is expressed by $$\delta L = L_1 - L_2 = \left(\frac{1}{4} + n\right)\lambda_{sp}, \; n = 0, 1, 2 \ldots \quad (6)$$

with respect to wavelength λsp of surface plasmon, a mode made of circularly polarized light is generated at the opening 3.

Further, a relation ksp=2π/λsp exists as a condition under which the wavelength λsp of surface plasmon is determined.

The imaginary part Im (ksp) of the wave number of surface plasmon indicates attenuation of surface plasmon. When the thickness of the metal film 2 is 100 nm or more, the attenuation of the surface plasmon is approximately 10 μm.

The lengths of the periodic grooves 8, 9, 10, and 11 should be 10 μm or less, or should be substantially the same as the length of the laser spot 75 of the semiconductor laser in FIG. 10. In order to excite surface plasmon, each of the periodic grooves 8, 9, 10, and 11 should include at least two grooves.

The shape of each of the grooves 8-*n*, 9-*n*, 10-*n*, and 11-*n* may be a curved shape. However, the curved shape leads to decrease of the efficiency in converting linearly polarized light into circularly polarized light, and therefore the shape is preferably a linear shape.

(4-2. Width of Groove and Cross Section of Opening)

Figure 13:
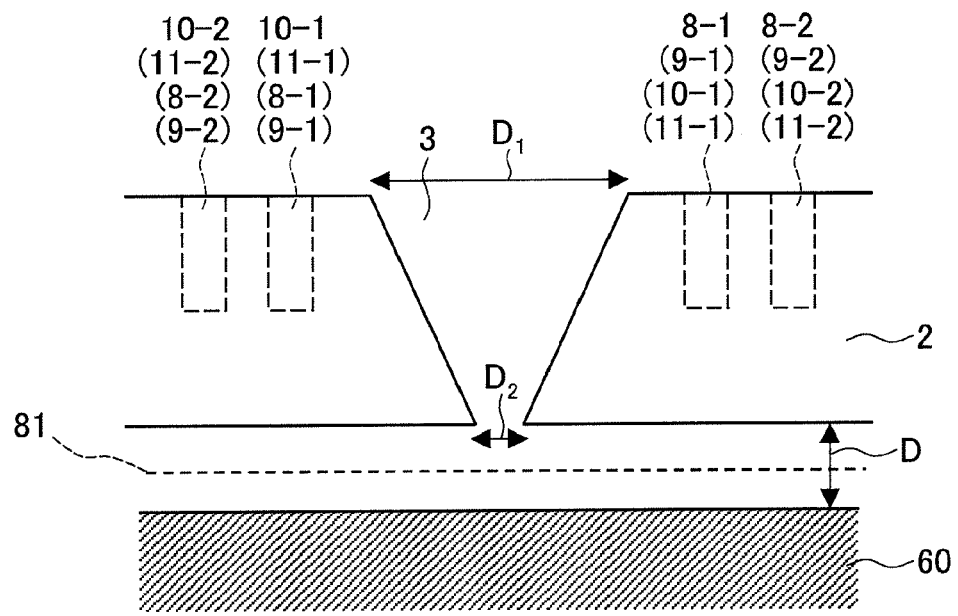
FIG. 13 is a cross sectional drawing illustrating an opening with a tapered shape, formed in the metal film of the slider in accordance with one embodiment of the present invention.

The following explains a cross section of the opening 3 in the metal film 2 with reference to FIGS. 1 and 13.

It is assumed that d indicates each of the widths of the grooves 8-*n*, 9-*n*, 10-*n*, and 11-*n* in directions perpendicular to the axes 4, 5, 6, and 7, respectively. In a case of the periodic groove 8 for example, d indicates the width of the groove 8-*n* in a direction perpendicular to the axis 4.

d that is the width of the groove should be substantially the same as the length of λsp that is spatial resolution of surface plasmon.

Further, it is preferable that the length of the groove in a direction perpendicular to d is approximately several microns, and the depth of the groove is approximately several hundred nm.

It is assumed that r indicates the radius of the opening 3. An area larger than r, i.e. (d−r) cannot contribute to the mode in the opening 3.

That is, surface plasmon passes through areas beside the opening 3. In particular, as the opening 3 is smaller, the efficiency in converting linearly polarized light into circularly polarized light drops.

FIG. 13 is an enlarged drawing illustrating the surrounding of the opening 3 in FIG. 1. The magnetic storage layer 60 is positioned away by the gap D from the metal film 2. It is assumed that the xy-plane 81 is substantially at the center of the gap D. Further, it is assumed that D1 is the diameter of the opening 3 at the side where the periodic grooves 8, 9, 10, and 11 are provided on the surface of the metal film 2, and D2 is the diameter of the opening 3 at the side closer to the magnetic storage layer 60. D2 that is at the side where light is irradiated is narrower than D1.

In the present embodiment, it is assumed that r1<200 nm and r2<r1 where r1 is the radius of D1 and r2 is the radius of D2, and the distances between the end of D1 and the grooves 8-1, 9-1, 10-1, and 11-1 that are adjacent to D1 are less than 100 nm.

This allows reducing (d−r1). Further, increasing the widths of the grooves 8-*n*, 9-*n*, 10-*n*, and 11-*n* allows increasing binding efficiency.

Consequently, it is possible to prevent the drop of the efficiency in converting linearly polarized light into circularly polarized light even when D2 that is at the side where light is irradiated drops.

Figure 14:
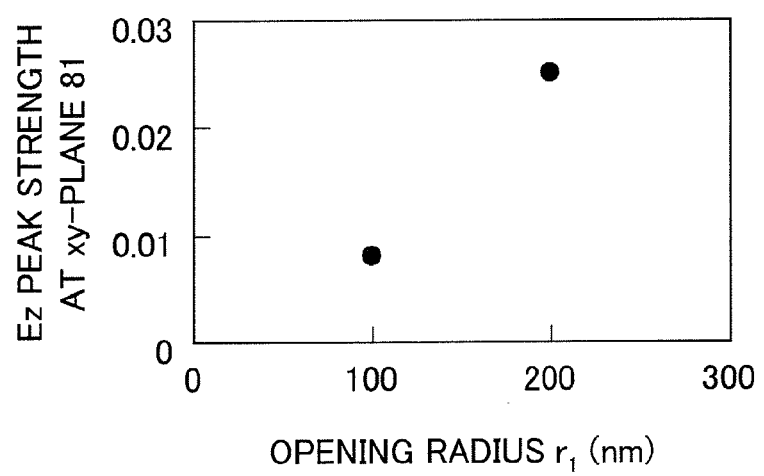
FIG. 14 is a graph illustrating an efficiency in conversion from linearly polarized light into circularly polarized light by the opening with a tapered shape formed in the metal film of the slider in accordance with one embodiment of the present invention.

FIG. 14 illustrates an example of calculating the conversion efficiency with use of FDTD method.

In the arrangement used in the calculation of FIG. 5 in the present embodiment, the radius of the opening 3 at the side where light is irradiated was set to 40 nm, and r1 that is the radius of the opening at the side where light is incident was changed from 100 nm to 200 nm.

Further, with the peak strength of the instant electric field Ez at the xy-plane 81, the conversion efficiencies were compared with each other.

FIG. 14 shows that as the radius r1 of the opening at the side where light is incident is larger, the peak strength of the instant electric field Ez at the xy-plane 81 is higher. That is, the conversion efficiency is higher.

As described above, the slider of the present invention is designed such that an opening is formed on a surface of the metal film, a plurality of axes cross each other substantially perpendicularly at the opening, a plurality of periodic grooves are provided for respective axes, and each of the periodic grooves includes a plurality of grooves substantially perpendicular to the axis for which each periodic groove is provided, and the periodic grooves are positioned point-symmetrically with respect to the opening.

This allows converting linearly polarized light irradiated to the surface of the metal film into circularly polarized light. In other words, this allows converting the flow of light energy irradiated to the surface of the metal film into evanescent light with use of the periodic grooves and generating swirl of evanescent light with the opening at the center. Further, it is possible to make the size of the swirl smaller than the resolution limit of light, i.e. the wavelength of light.

Further, since the opening is formed at the center of the periodic grooves, it is possible to effectively lead the swirl of the evanescent light to the opening.

Consequently, an optical component for converting linearly polarized light into circularly polarized light is unnecessary, which allows downsizing the slider. This allows reducing the weight of the slider, which allows reducing moment of inertia of the slider. This allows increasing access speed of the slider.

As described above, the slider of the present invention is a slider for writing information in and reading information from a magnetic storage layer, including a metal film, an opening being formed on a surface of the metal film, a plurality of axes crossing each other substantially perpendicularly at the opening, a plurality of periodic grooves being provided for respective axes, and each of the periodic grooves including a plurality of grooves substantially perpendicular to the axis for which each periodic groove is provided, and the periodic grooves being positioned point-symmetrically with respect to the opening.

This allows converting linearly polarized light irradiated to the surface of the metal film into circularly polarized light. In other words, this allows converting the flow of light energy irradiated to the surface of the metal film into evanescent light with use of the periodic grooves and generating swirl of evanescent light with the opening at the center. Further, it is possible to make the size of the swirl smaller than the resolution limit of light, i.e. the wavelength of light.

Further, since the opening is formed at the center of the periodic grooves, it is possible to effectively lead the swirl of the evanescent light to the opening.

Consequently, an optical component for converting linearly polarized light into circularly polarized light is unnecessary, which allows downsizing the slider. This allows reducing the weight of the slider, which allows reducing moment of inertia of the slider. This allows increasing access speed of the slider.

It is preferable to arrange the slider of the present invention so that a cross section of the opening in a direction perpendicular to the surface of the metal film has a tapered shape, and an open area of the opening at one plane of the metal film which plane includes the periodic grooves is larger than an open area of the opening at the other plane.

Evanescent light generated at the surface of the metal film is transmitted inside the slider via the opening. However, at an area larger than the radius of the opening, the evanescent light cannot be transmitted via the opening. Therefore, the opening area of the opening at the side where periodic grooves are provided is enlarged. This allows preventing drop of the efficiency in the evanescent light passing the opening even when the radius of the opening is made smaller.

Further, the integrated slider of the present invention is an integrated slider, including the slider and an optical component positioned adjacently to the slider, the optical component causing linearly polarized light to be incident to the surface of the metal film and causing circularly polarized light to be irradiated from the opening.

Consequently, it is unnecessary to use a component such as a ¼ wavelength plate in order to convert wavelength of light incident from an optical component. Therefore, it is possible to convert linearly polarized light into circularly polarized light only with a simple arrangement.

This allows reducing the number of components, which allows downsizing the integrated slider substantially as small as the optical component. Consequently, it is possible to provide an integrated slider that is small and is capable of converting linearly polarized light into circularly polarized light.

Further, it is preferable to arrange the integrated slider of the present invention so that the optical component is combined with the metal film.

With the arrangement, a part of the linearly polarized light irradiated by the optical component which part is not bound to surface plasmon by the periodic grooves contributes to induction and discharge of the surface plasmon again in the optical component.

Further, it is preferable to arrange the integrated slider of the present invention so that the optical component is a resonator of semiconductor laser.

With the arrangement, it is possible to provide a semiconductor laser oscillating device that is small and is capable of irradiating circularly polarized laser.

Further, it is preferable to arrange the integrated slider of the present invention so that the opening is smaller than a wavelength of the linearly polarized light.

With the arrangement, it is possible to generate evanescent light whose wavelength is smaller than that of the linearly polarized light.

Further, the hybrid storage device of the present invention is a hybrid storage device, including the slider and a disc substrate including a magnetic storage layer positioned to face the slider, linearly polarized light from an optical component being lead to the opening so as to provide heat energy to the magnetic storage layer, and an external magnetic field being applied on the magnetic storage layer so as to carry out magnetic storage.

Since the slider can convert linearly polarized light into circularly polarized light with a simple arrangement, it is possible to greatly reduce the number of optical components in the slider compared with a conventional slider in which an evanescent light generation mechanism, an external magnetic field applying device, a reproduction head, and semiconductor laser are combined with each other. This allows downsizing the slider substantially as small as a semiconductor laser oscillating device This allows reducing the weight of the slider, which allows reducing moment of inertia of the slider. Consequently, it is possible to increase accessing speed of the slider when recording the magnetic information and when reading the magnetic information.

This allows providing a hybrid storage device having high accessing speed of the slider when recording the magnetic information and when reading the magnetic information.

Further, the circularly polarized light allows generating thermal distribution that is rotation-symmetrical with respect to the magnetic storage layer. Here, since distribution of the evanescent light is rotation-symmetry, heat generated by the evanescent light is concentrated at the center of the rotation symmetry. This allows downsizing thermal distribution to the size smaller than that of the distribution of the evanescent light.

INDUSTRIAL APPLICABILITY

The invention is applicable not only to storage/reproduction of magnetic information in/from a magnetic storage medium, but also to a hybrid storage device for storing/reproducing information in/from a high-density storage medium such as a hybrid storage medium, and to a manufacture field thereof.

The invention claimed is:

1. A slider for writing information in and reading information from a magnetic storage layer, comprising a metal film, an opening being formed on a surface of the metal film, a plurality of axes crossing each other substantially perpendicularly at the opening, a first periodic groove, a second periodic groove, a third periodic groove, and a fourth periodic groove being provided for respective axes, and each of the first, second, third, and fourth periodic grooves including a plurality of grooves substantially perpendicular to the axis for which each periodic groove is provided, a distance between adjacent grooves of the plurality of grooves being a distance that allows surface plasmon to be excited when light is incident to the metal film, the first, second, third, and fourth periodic grooves being positioned point-symmetrically with respect to the opening, the second periodic groove being positioned counterclockwise by substantially 90 degrees from the first periodic groove around the opening, the third periodic groove being positioned counterclockwise by substantially 90 degrees from the second periodic groove around the opening, the fourth periodic groove being positioned counterclockwise by substantially 90 degrees from the third periodic groove around the opening, and relations $L_1=L_3$, $L_2=L_4$, $L_1-L_2=\lambda_{sp}/4$ being met, where $L_1$ indicates a distance between the opening and a groove in the first periodic groove that is closest to the opening, $L_2$ indicates a distance between the opening and a groove in the second periodic groove that is closest to the opening, $L_3$ indicates a distance between the opening and a groove in the third periodic groove that is closest to the opening, $L_4$ indicates a distance between the opening and a groove in the fourth periodic groove that is closest to the opening, and $\lambda_{sp}$ indicates a wavelength of the surface plasmon.

2. The slider as set forth in claim 1, wherein a cross section of the opening in a direction perpendicular to the surface of the metal film has a tapered shape, and an open area of the opening at one plane of the metal film which plane includes the periodic grooves is larger than an open area of the opening at the other plane.

3. An integrated slider, comprising a slider as set forth in claim 1 and an optical component positioned adjacently to the slider, the optical component causing linearly polarized light to be incident to the surface of the metal film and causing circularly polarized light to be irradiated from the opening.

4. The integrated slider as set forth in claim 3, wherein the optical component is combined with the metal film.

5. The integrated slider as set forth in claim 3, wherein the optical component is a resonator of semiconductor laser.

6. The integrated slider as set forth in claim 3, wherein the opening is smaller than a wavelength of the linearly polarized light.

7. A hybrid storage device, comprising: a slider as set forth in claim 1; and a disc substrate including a magnetic storage layer positioned to face the slider, linearly polarized light from an optical component being lead to the opening so as to provide heat energy to the magnetic storage layer, and an external magnetic field being applied on the magnetic storage layer so as to carry out magnetic storage.

8. A slider for writing information in and reading information from a magnetic storage layer, comprising a metal film, an opening being formed on a surface of the metal film, a plurality of axes crossing each other substantially perpendicularly at the opening, a first periodic groove, a second periodic groove, a third periodic groove, and a fourth periodic groove being provided for respective axes, and each of the first, second, third, and fourth periodic grooves including a plurality of grooves substantially perpendicular to the axis for which each periodic groove is provided, a distance between adjacent grooves of the plurality of grooves being a distance that allows surface plasmon to be excited when light is incident to the metal film, the first, second, third, and fourth periodic grooves being positioned point-symmetrically with respect to the opening, the second periodic groove being positioned clockwise by substantially 90 degrees from the first periodic groove around the opening, the third periodic groove being positioned clockwise by substantially 90 degrees from the second periodic groove around the opening, the fourth periodic groove being positioned clockwise by substantially 90 degrees from the third periodic groove around the opening, and relations $L_1=L_3$, $L_2=L_4$, $L_2-L_1=\lambda_{sp}/4$ being met, where $L_1$ indicates a distance between the opening and a groove in the first periodic groove that is closest to the opening, $L_2$ indicates a distance between the opening and a groove in the second periodic groove that is closest to the opening, $L_3$ indicates a distance between the opening and a groove in the third periodic groove that is closest to the opening, $L_4$ indicates a distance between the opening and a groove in the fourth periodic groove that is closest to the opening, and $\lambda_{sp}$ indicates a wavelength of the surface plasmon.

9. An integrated slider, comprising a slider as set forth in claim 8 and an optical component positioned adjacently to the slider, the optical component causing linearly polarized light to be incident to the surface of the metal film and causing circularly polarized light to be irradiated from the opening.

10. A hybrid storage device, comprising: a slider as set forth in claim 8; and a disc substrate including a magnetic storage layer positioned to face the slider, linearly polarized light from an optical component being lead to the opening so as to provide heat energy to the magnetic storage layer, and an external magnetic field being applied on the magnetic storage layer so as to carry out magnetic storage.

* * * * *